(12) United States Patent
Arai et al.

(10) Patent No.: US 6,551,418 B2
(45) Date of Patent: *Apr. 22, 2003

(54) MAGNETIC POWDER AND ISOTROPIC BONDED MAGNET

(75) Inventors: Akira Arai, Shimosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/755,953

(22) Filed: Jan. 5, 2001

(65) Prior Publication Data

US 2001/0023715 A1 Sep. 27, 2001

(30) Foreign Application Priority Data

Jan. 7, 2000 (JP) ........................................ 2000-001804

(51) Int. Cl.⁷ .............................................. H01F 1/057
(52) U.S. Cl. ........................................................ 148/302
(58) Field of Search ................................. 148/301, 302

(56) References Cited

U.S. PATENT DOCUMENTS

| 5,725,792 A | 3/1998 | Panchanathan |
| 6,171,410 B1 * | 1/2001 | Kojima et al. ............... 148/302 |

FOREIGN PATENT DOCUMENTS

| EP | 0 242 187 | 10/1987 |
| EP | 1 017 066 A | 7/2000 |
| EP | 1 061 532 A | 12/2000 |
| JP | 63-213324 A * | 9/1988 |
| JP | 07-054106 | 2/1995 |
| JP | 09-007811 | 1/1997 |
| JP | 2727505 | 12/1997 |

OTHER PUBLICATIONS

B. Grieb et al., Influence of Al–Based Additions on Coercivity and Microstructure In Fe–Nd–B Magnets, Journal of Magnetism and Magnetic Materials 80 (1989) pp. 75–79.*

Chang, W.C. et al, "Magnetic Properties Enhancement of Alpha–Fe/Nd2Fe14B–Type Nanocomposites by Co Substitution", Journal of Applied Physics, American Institute of Physics, New York, vol. 83, No. 4, Feb. 15, 1998, pp. 2147–2151.

Grieb, B. et al, "Phase Relations and Magnetic Properties of New Phases in the Fe–Nd–AL and Fe–ND–C Systems and Their Influence on Magnets", IEEE Transactions on Magnetics, IEEE Inc., New York, vol. 26, No. 5, Sep. 1, 1990, pp. 1367–1369.

(List continued on next page.)

Primary Examiner—John Sheehan
(74) Attorney, Agent, or Firm—Harness, Dickey & Pierce, P.L.C.

(57) ABSTRACT

Disclosed herein is a magnetic powder which can provide a bonded magnet having excellent magnetic properties and having excellent reliability especially excellent heat stability. The magnetic powder is composed of an alloy composition represented by $R_x(Fe_{1-y}Co_y)_{100-x-z-w}B_zAl_w$ (where R is at least one kind of rare-earth element, x is 7.1–9.9 at %, y is 0–0.30, z is 4.6–6.9 at %, and w is 0.02–1.5 at %), the magnetic powder being constituted from a composite structure having a soft magnetic phase and a hard magnetic phase, wherein the magnetic powder has magnetic properties in which, when the magnetic powder is formed into an isotropic bonded magnet having a density $\rho$ [Mg/m³] by mixing with a binding resin and then molding it, the maximum magnetic energy product $(BH)_{max}$[kJ/m³] of the bonded magnet at the room temperature satisfies the relationship represented by the formula $(BH)_{max}/\rho^2[\times 10^{-9} \, J \cdot m^3/g^2] \geq 2.1$, and the intrinsic coercive force $(H_{CJ})$ of the bonded magnet at the room temperature is in the range of 320–720 kA/m.

14 Claims, 5 Drawing Sheets

OTHER PUBLICATIONS

Folks, L. et al, "Magnetic Properties of Novel Resin-Bonded Exchange Coupled Rare-Earth Magnets", Journal of Magnetism and Magnetic Materials, Elsevier Science Publishers, Amsterdam, NL, vol. 147, No. 3, Jun. 1, 1995, pp. 360–366.

Patent Abstracts of Japan, vol. 1996, No. 9, Sep. 30, 1996.

EPO Search Report for EP 01 100 371.2.

Shinichi Hayashida, et al., "*Flux stability in Nd–Fe–B-based exchange–coupled spring magnets*", MAG–97–211, pp. 19–24.

L. Schultz & K.–H.Müller, "*Rare–Earth Magnets and their Applications*" vol. 1, pp. 199–204, (Aug. 30 –Sep. 3, 1998).

* cited by examiner

MAGNETIC POWDER AND ISOTROPIC BONDED MAGNET

BACKGROUND OF THE INVENTION

1. Field of the Invention

The present invention relates to magnetic powder and an isotropic bonded magnet. More particularly, the present invention relates to magnetic powder and an isotropic bonded magnet which is produced, for example, using the magnetic powder.

2. Description of the Prior Art

For reduction in size of motors, it is desirable that a magnet has a high magnetic flux density (with the actual permeance) when it is used in the motor. Factors for determining the magnetic flux density of a bonded magnet include magnetization of the magnetic powder and the content of the magnetic powder contained in the bonded magnet. Accordingly, when the magnetization of the magnetic powder itself is not sufficiently high, a desired magnetic flux density cannot be obtained unless the content of the magnetic powder in the bonded magnet is raised to an extremely high level.

At present, most of practically used high performance rare-earth bonded magnets use the isotropic bonded magnets which are made using MQP-B powder manufactured by MQI Inc. as the rare-earth magnetic powder thereof. The isotropic bonded magnets are superior to the anisotropic bonded magnets in the following respect; namely, in the manufacture of the bonded magnet, the manufacturing process can be simplified because no magnetic field orientation is required, and as a result, the rise in the manufacturing cost can be restrained. On the other hand, however, the conventional isotropic bonded magnets represented by those manufactured using the MQP-B powder involve the following problems.

(1) The conventional isotropic bonded magnets do not have a sufficiently high magnetic flux density. Namely, because the magnetic powder that has been being used has poor magnetization, the content of the magnetic powder to be contained in the bonded magnet has to be increased. However, the increase in the content of the magnetic powder leads to the deterioration in the moldability of the bonded magnet, so there is a certain limit in this attempt. Moreover, even if the content of the magnetic powder is somehow managed to be increased by changing the molding conditions or the like, there still exists a limit to the obtainable magnetic flux density. For these reasons, it is not possible to reduce the size of the motor by using the conventional isotropic bonded magnets.

(2) Although there are reports concerning nanocomposite magnets having high remanent magnetic flux densities, their coercive forces, on the contrary, are so small that the magnetic flux densities (for the permeance in the actual use) obtainable when they are practically used in motors are very low. Further, these magnets have poor heat stability due to their small coercive forces.

(3) The conventional bonded magnets have low corrosion resistance and heat resistance. Namely, in these magnets, it is necessary to increase the content of the magnetic powder to be contained in the bonded magnet in order to compensate the low magnetic properties (magnetic performance) of the magnetic powder. This means that the density of the bonded magnet becomes extremely high. As a result, the corrosion resistance and heat resistance of the bonded magnet are deteriorated, thus resulting in low reliability.

SUMMARY OF THE INVENTION

It is therefore an object of the present invention to provide magnetic powder that can produce a bonded magnet having excellent magnetization and having excellent reliability especially excellent temperature characteristics (that is, heat resistance and heat stability), and provide an isotropic bonded magnet formed from the magnetic powder.

In order to achieve the above object, the present invention is directed to magnetic powder composed of an alloy composition represented by $R_x(Fe_{1-y}Co_y)_{100-x-z-w}B_zAl_w$ (where R is at least one kind of rare-earth element, x is 7.1–9.9 at %, y is 0–0.30, z is 4.6–6.9 at %, and w is 0.02–1.5 at %), the magnetic powder being constituted from a composite structure having a soft magnetic phase and a hard magnetic phase, wherein the magnetic powder has magnetic properties in which, when the magnetic powder is formed into an isotropic bonded magnet having a density $\rho$ [Mg/m$^3$] by mixing with a binding resin and then molding it, the maximum magnetic energy product $(BH)_{max}$[kJ/m$^3$] of the bonded magnet at the room temperature satisfies the relationship represented by the formula $(BH)_{max}/\rho^2[\times 10^{-9}$ J·m$^3$/g$^2] \geq 2.1$, and the intrinsic coercive force $(H_{CJ})$ of bonded the magnet at the room temperature is in the range of 320–720 kA/m.

According to the magnetic powder as described above, it is possible to provide bonded magnets having excellent magnetic properties as well as excellent heat resistance (heat stability) and corrosion resistance.

In the present invention, it is preferred that when the magnetic powder is formed into an isotropic bonded magnet having a density $\rho$ [Mg/m$^3$] by mixing with a binding resin and then molding it, the remanent magnetic flux density Br[T] at the room temperature satisfies the relationship represented by the formula of Br/$\rho$ [×10$^{-6}$ T·m$^3$/g]$\geq 0.125$.

This makes it possible to further improve magnetic properties as well as heat resistance (heat stability) and corrosion resistance.

Another aspect of the present invention is directed to magnetic powder composed of an alloy composition represented by $R_x(Fe_{1-y}Co_y)_{100-x-z-w}B_zAl_w$ (where R is at least one kind of rare-earth element, x is 7.1–9.9 at %, y is 0–0.30, z is 4.6–6.9 at %, and w is 0.02–1.5 at %), the magnetic powder being constituted from a composite structure having a soft magnetic phase and a hard magnetic phase, wherein the magnetic powder has magnetic properties in which, when the magnetic powder is formed into an isotropic bonded magnet having a density $\rho$ [Mg/m$^3$] by mixing with a binding resin and then molding it, the remanent magnetic flux density Br[T] at the room temperature satisfies the relationship represented by the formula of Br/$\rho$ [×10$^{-6}$ T·m$^3$/g]$\geq 0.125$.

According to the magnetic powder as described above, it is also possible to provide bonded magnets having excellent magnetic properties as well as excellent heat resistance (heat stability) and corrosion resistance.

In this magnetic powder, it is preferred that when the magnetic powder is formed into an isotropic bonded magnet by mixing with a binding resin and then molding it, the intrinsic coercive force $(H_{CJ})$ of the magnet at the room temperature is in the range of 320–720 kA/m. This makes it possible to perform satisfactory magnetization even in the case where a sufficient magnetizing field can not be available, thereby enabling to obtain sufficient magnetic flux density.

Further, in the present invention, it is preferred that when the magnetic powder is formed into an isotropic bonded magnet by mixing with a binding resin and then molding it, the absolute value of the irreversible flux loss (initial flux loss) is equal to or less than 6.2%. This makes it possible to provide bonded magnets having especially excellent heat resistance (heat stability).

In these cases, it is preferred that said R comprises rare-earth elements mainly containing Nd and/or Pr. This makes it possible to improve saturation magnetization of the hard phase of the composite structure (in particular, nanocomposite structure), and thereby the coercive force is further enhanced.

Further, it is also preferred that said R includes Pr and its ratio with respect to the total mass of said R is 5–75%. This makes it possible to improve the coercive force and rectangularity without lowering the remanent magnetic flux density.

Further, it is also preferred that said R includes Dy and its ratio with respect to the total mass of said R is equal to or less than 14%. This makes it possible to improve the coercive force and the heat resistance (heat stability) without markedly lowering the remanent magnetic flux density.

In the present invention, it is also preferred that the magnetic powder is obtained by quenching the alloy of a molten state. According to this, it is possible to refine the microstructure (crystalline grains) relatively easily, thereby enabling to further improve the magnetic properties of the bonded magnet.

Further, it is also preferred that the magnetic powder is obtained by milling a melt spun ribbon of the alloy which is manufactured by using a cooling roll. According to this, it is possible to refine the microstructure (crystalline grains) relatively easily, thereby enabling to further improve the magnetic properties of the bonded magnet.

Furthermore, it is also preferred that the magnetic powder is subjected to a heat treatment for at least once during the manufacturing process or after its manufacture. According to this, homogeneity (uniformity) of the structure can be obtained and influence of stress introduced by the milling process can be removed, thereby enabling to further improve the magnetic properties of the bonded magnet.

In the magnetic powders described above, it is preferred that the average particle size lies in the range of 0.5–150 $\mu$m. This makes it possible to further improve the magnetic properties. Further, when the magnetic powder is used in manufacturing bonded magnets, it is possible to obtain bonded magnets having a high content of the magnetic powder and having excellent magnetic properties.

The other aspect of the present invention is directed to an isotropic rare-earth bonded magnet formed by binding a magnetic powder containing Al with a binding resin, wherein the isotropic rare-earth bonded magnet is characterized in that, when the density of the an isotropic bonded magnet is $\rho$ [Mg/m$^3$], the maximum magnetic energy product (BH)$_{max}$[kJ/m$^3$] at the room temperature satisfies the relationship represented by the formula (BH)$_{max}$/$\rho^2$[×10$^{-9}$ J·m$^3$/g$^2$]$\geq$2.1, and the intrinsic coercive force (H$_{CJ}$) of the magnet at the room temperature is in the range of 320–720 kA/m.

According to the above structure, it is possible to provide isotropic rare-earth bonded magnets having excellent magnetic properties as well as excellent heat resistance (heat stability) and corrosion resistance.

In this case, it is preferred that when the density of the isotropic bonded magnet is $\rho$ [Mg/m$^3$], the remanent magnetic flux density Br[T] at the room temperature satisfies the relationship represented by the formula of Br/$\rho$ [×10$^{-6}$ T·m$^3$/g]$\geq$0.125.

This makes it possible to further improve magnetic properties as well as heat resistance (heat stability) and corrosion resistance.

Other aspect of the present invention is directed to an isotropic bonded magnet formed by binding a magnetic powder containing Al with a binding resin, wherein the isotropic bonded magnet is characterized in that, when the density of the isotropic bonded magnet is $\rho$ [Mg/m$^3$], the remanent magnetic flux density Br[T] at the room temperature satisfies the relationship represented by the formula of Br/$\rho$ [×10$^{-6}$ T·m$^3$/g]$\geq$0.125.

According to the above structure, it is also possible to provide isotropic bonded magnets having excellent magnetic properties as well as excellent heat resistance (heat stability) and corrosion resistance.

In this case, it is preferred that the intrinsic coercive force (H$_{CJ}$) of the bonded magnet at the room temperature is in the range of 320–720 kA/m. This makes it possible to perform satisfactory magnetization even in the case where a sufficient magnetizing field can not be available, thereby enabling to obtain a sufficient magnetic flux density.

In this isotropic bonded magnet, it is preferred that said magnetic powder is formed of R-TM-B—Al based alloy (where R is at least one rare-earth element and TM is a transition metal containing Iron as a major component thereof). This also makes it possible to provide an isotropic bonded magnet having particularly excellent magnetic properties as well as particularly excellent heat resistance (heat stability) and corrosion resistance.

Furthermore, in this isotropic bonded magnet, it is also preferred that the magnetic powder is composed of an alloy composition represented by R$_x$(Fe$_{1-y}$Co$_y$)$_{100-x-z-w}$B$_z$Al$_w$, (where R is at least one kind of rare-earth element, x is 7.1–9.9 at %, y is 0–0.30, z is 4.6–6.9 at %, and w is 0.02–1.5 at %). This also makes it possible to provide an isotropic bonded magnet having particularly excellent magnetic properties as well as particularly excellent heat resistance (heat stability) and corrosion resistance.

Moreover, in this isotropic bonded magnet, it is also preferred that said R comprises rare-earth elements mainly containing Nd and/or Pr. This makes it possible to further improve the coercive force.

In this case, it is preferred that said R includes Pr and its ratio with respect to the total mass of said R is 5–75%. This makes it possible to improve the coercive force and rectangularity with less drop of the remanent magnetic flux density.

Further, it is also preferred that said R includes Dy and its ratio with respect to the total mass of said R is equal to or less than 14%. This makes it possible to improve the coercive force and a heat resistance (heat stability) without markedly lowering the remanent magnetic flux density.

In the isotropic bonded magnets as described above, it is preferred that the average particle size of the magnetic powder lies in the range of 0.5–150 $\mu$m. This makes it possible to obtain an isotropic bonded magnet having a high content of the magnetic powder and having excellent magnetic properties.

Further, in the isotropic bonded magnets as described above, it is also preferred that the absolute value of the irreversible flux loss (initial flux loss) is equal to or less than 6.2%. This makes it possible to provide particularly excellent heat resistance (heat stability).

Furthermore, in the isotropic bonded magnets as described above, it is also preferred that the magnetic powder is constituted from a composite structure having a soft magnetic phase and a hard magnetic phase. This improves magnetizability and heat resistance (heat stability), thus leading to less deterioration in the magnetic properties with elapse of time.

Preferably, the isotropic bonded magnets as described above are to be subjected to multipolar magnetization or have already been subjected to multipolar magnetization. According to this, satisfactory magnetization can be made even in the case where sufficient magnetizing magnetic field is not obtained, thereby enabling to obtain sufficient magnetic flux density.

Further, preferably, the isotropic bonded magnets as described above are used for a motor. By using the bonded magnet to motors, it becomes possible to provide small and high performance motors.

These and other objects, structures and advantages of the present invention will be apparent from the following detailed description of the invention and the examples taken in conjunction with the appended drawings.

DETAILED DESCRIPTION OF THE INVENTION

Figure 1:
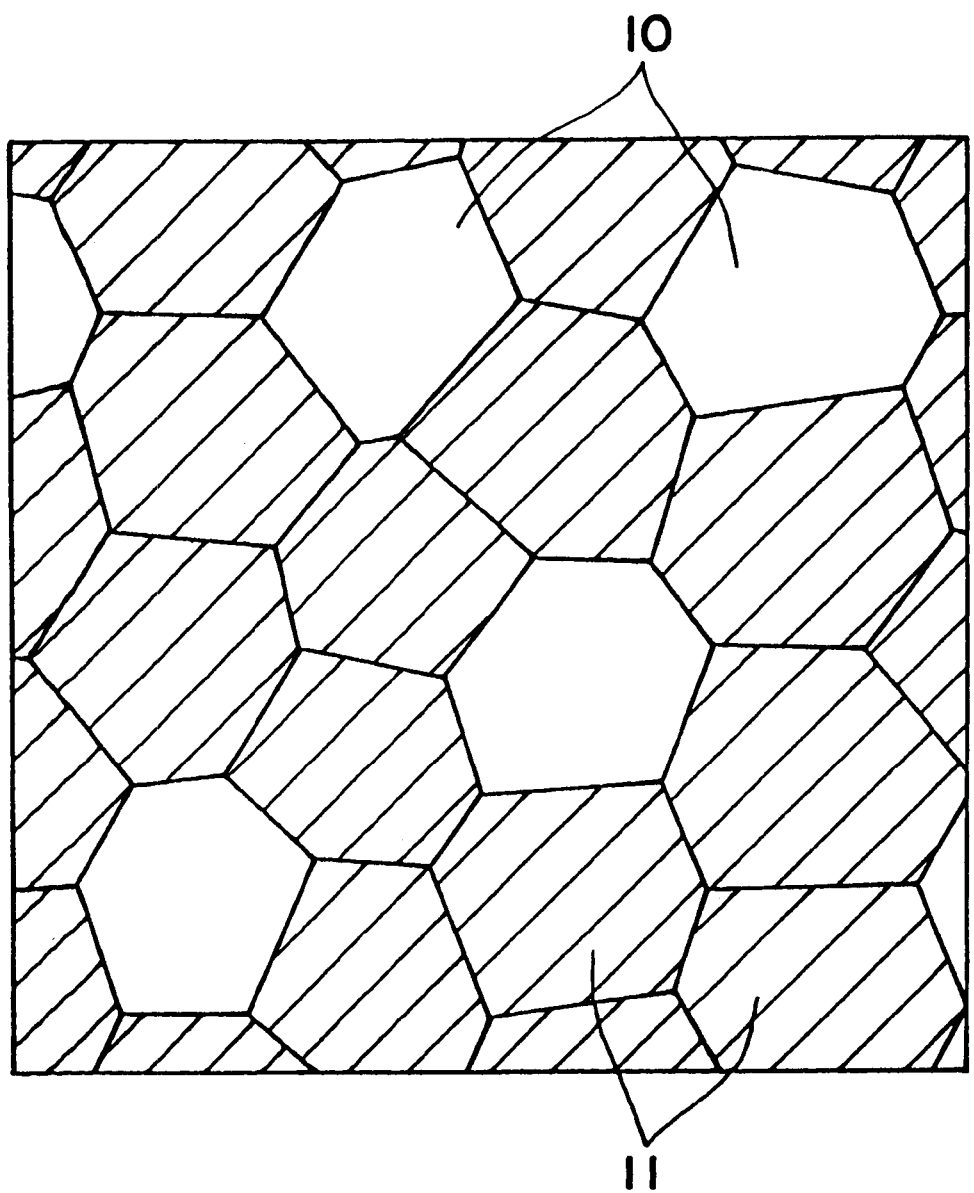
FIG. 1 is an illustration which schematically shows one example of a composite structure (nanocomposite structure) of magnetic powder according to the present invention.

In the following, embodiments of the magnetic powder according to this invention and the isotropic rare-earth bonded magnet formed from the magnetic powder will be described in detail.

General Description of the Invention

At present, a magnet having high magnetic flux density is practically required in order to reduce the size of motors or other electrical devices. In a bonded magnet, factors that determine the magnetic flux density are the magnetization of magnetic powder and the content (compositional ratio) of the magnetic powder contained in the bonded magnet. When the magnetization of the magnetic powder itself is not so high, a desired magnetic flux density cannot be obtained unless the content of the magnetic powder in the bonded magnet is increased to an extremely high level.

As described in the above, the MQP-B powder made by MQI Inc. which is now being widely used can not provide sufficient magnetic flux density depending on its use. As a result, in manufacturing the bonded magnets, it is required to increase the content of the magnetic powder in the bonded magnet, that is, it is required to increase the magnetic flux density. However, this in turn leads to the lack of reliability in the corrosion resistance, heat resistance and mechanical strength thereof and the like. Further, there is also a problem in that the obtained magnet has a poor magnetizability due to its high coercivity.

In contrast, the magnetic powder and the isotropic bonded magnet according to this invention can obtain a sufficient magnetic flux density and an adequate coercive force. As a result, without extremely increasing the content of the magnetic powder in the bonded magnet, it is possible to provide a bonded magnet having high strength and having excellent moldability, corrosion resistance and magnetizability. This makes it possible to reduce the size of the bonded magnet and increase its performance, thereby contributing to reduction in size of motors and other devices employing magnets.

Further, the magnetic powder of the present invention may be formed so as to constitute a composite structure having a hard magnetic phase and a soft magnetic phase.

While the MQP-B powder made by MQI Inc. is a single phase structure of a hard magnetic phase, the magnetic powder of the present invention has the composite structure which has a soft magnetic phase with high magnetization. Accordingly, it has an advantage that the total magnetization of the system as a whole is high. Further, since the recoil permeability of the bonded magnet becomes high, there is an advantage that, even after a reverse magnetic field has been applied, the demagnetizing factor remains small.

Alloy Composition of Magnetic Powder

Preferably, the magnetic powder according to this invention is formed of R-TM-B—Al based alloys (where R is at least one rare-earth element and TM is a transition metal containing Iron as a major component thereof). Among these alloys, an alloy having alloy compositions represented by $R_x(Fe_{1-y}Co_y)_{100-x-z-w}B_zAl_w$ (where R is at least one kind of rare-earth element, x is 7.1–9.9 at %, y is 0–0.30, z is 4.6–6.9 at %, and w is 0.02–1.5 at %) is particularly preferred.

Examples of the rare-earth elements R include Y, La, Ce, Pr, Nd, Pm, Sm, Eu, Gd, Tb, Dy, Ho, Er, Tm, Yb, Lu, and a misch metal. In this connection, R may include one kind or two or more kinds of these elements.

The content of R is set at 7.1–9.9 at %. When the content of R is less than 7.1 at %, sufficient coercive force cannot be obtained, and addition of Al enhances the coercive force only to a small extent. On the other hand, when the content of R exceeds 9.9 at %, a sufficient magnetic flux density fails to be obtained because of the drop in the magnetization potential.

Here, it is preferable that R includes the rare-earth elements Nd and/or Pr as its principal ingredient. The reason for this is that these rare-earth elements enhance the saturation magnetization of the hard magnetic phase which constitutes the composite structure (especially, nanocomposite structure), and are effective in realizing a satisfactory coercive force as a magnet.

Moreover, it is preferable that R includes Pr and its ratio to the total mass of R is 5–75%, and more preferably 20–60%. This is because when the ratio lies within this range, it is possible to improve the coercive force (coercivity) and the rectangularity by hardly causing a drop in the remanent magnetic flux density.

Furthermore, it is also preferable that R includes Dy and its ratio to the total mass of R is equal to or less than 14%. When the ratio lies within this range, the coercive force can be improved without causing marked drop in the remanent magnetic flux density, and the temperature characteristic (such as heat stability) can be also improved.

Cobalt (Co) is a transition metal element having properties similar to Fe. By adding Co, that is by substituting a part of Fe by Co, the Curie temperature is elevated and the temperature characteristic of the magnetic powder is improved. However, if the substitution ratio of Fe by Co exceeds 0.30, both of the coercive force and the magnetic flux density tend to fall off. The range of 0.05–0.20 of the substitution ratio of Fe by Co is more preferable since in this range not only the temperature characteristic of the magnetic powder but also the magnetic flux density thereof are improved.

Boron (B) is an element which is important for obtaining high magnetic properties, and its content is set at 4.6–6.9 at %. When the content of B is less than 4.6 at %, the rectangularity of the B—H (J-H) loop is deteriorated. On the other hand, when the content of B exceeds 6.9 at %, the nonmagnetic phase increases and thereby the magnetic flux density drops sharply.

Aluminum (Al) is an element which is advantageous for improving the coercive force, and the effect of improvement of the coercive force is conspicuous when its content lies in the range of 0.02–1.5 at %. In addition, the rectangularity and the maximum magnetic energy product are also improved in this range in accompanying with the improvement in the coercive force, and the heat resistance and corrosion resistance also become satisfactory. In this connection, however, when the content of R is less than 7.1 at %, these effects due to addition of Al are very small as described above. Further, when the content of Al exceeds 1.5 at %, the drop in the magnetization occurs.

Of course, Al itself is a known substance. However, in the present invention, it has been found through repeatedly conducted experiments and researches that by containing 0.02–1.5 at % of Al to the magnetic powder constituted from a composite structure having a soft magnetic phase and a hard magnetic phase, the following three effects are realized, in particular these three effects are realized at the same time, and this is the significance of the present invention.
(1) The coercive force of the magnetic powder can be improved while maintaining the excellent rectangularity and the maximum magnetic energy product.
(2) The irreversible flux loss can be improved, that is the absolute value thereof can be lowered.
(3) Better corrosion resistance can be maintained.

As described above, the significant feature of the present invention resides in the addition of a trace amount of or a small amount of Al. In this regard, it is to be noted that addition of Al in the amount of more than 1.5 at % leading to an adverse effect, thus it is out of the scope of the present invention.

In this connection, the preferred range of the content of Al is 0.02–1.5 at % as described above. In this case, it is more preferable that the upper limit of the range is 1.0 at %, and it is the most preferable that the upper limit is 0.8 at %.

In addition, for the purpose of further improving the magnetic properties, at least one other element selected from the group comprising Cu, Si, Ga, Ti, V, Ta, Zr, Nb, Mo, Hf, Ag, Zn, P, Ge, Cr and W (hereinafter, referred to as "Q") may be contained as needed. When containing the element belonging to Q, it is preferable that the content thereof should be equal to or less than 2 at %, and it is more preferable that the content thereof lies within the range of 0.1–1.5 at %, and it is the most preferable that the content thereof lies within the range of 0.2–1.0 at %.

The addition of the element belonging to Q makes it possible to exhibit an inherent effect of the kind of the element. For example, the addition of Cu, Si, Ga, V, Ta, Zr, Cr or Nb exhibits an effect of improving corrosion resistance.

Composite Structure

As described above, the magnetic material of the present invention has a composite structure having a soft magnetic phase and a hard magnetic phase.

Figure 2:
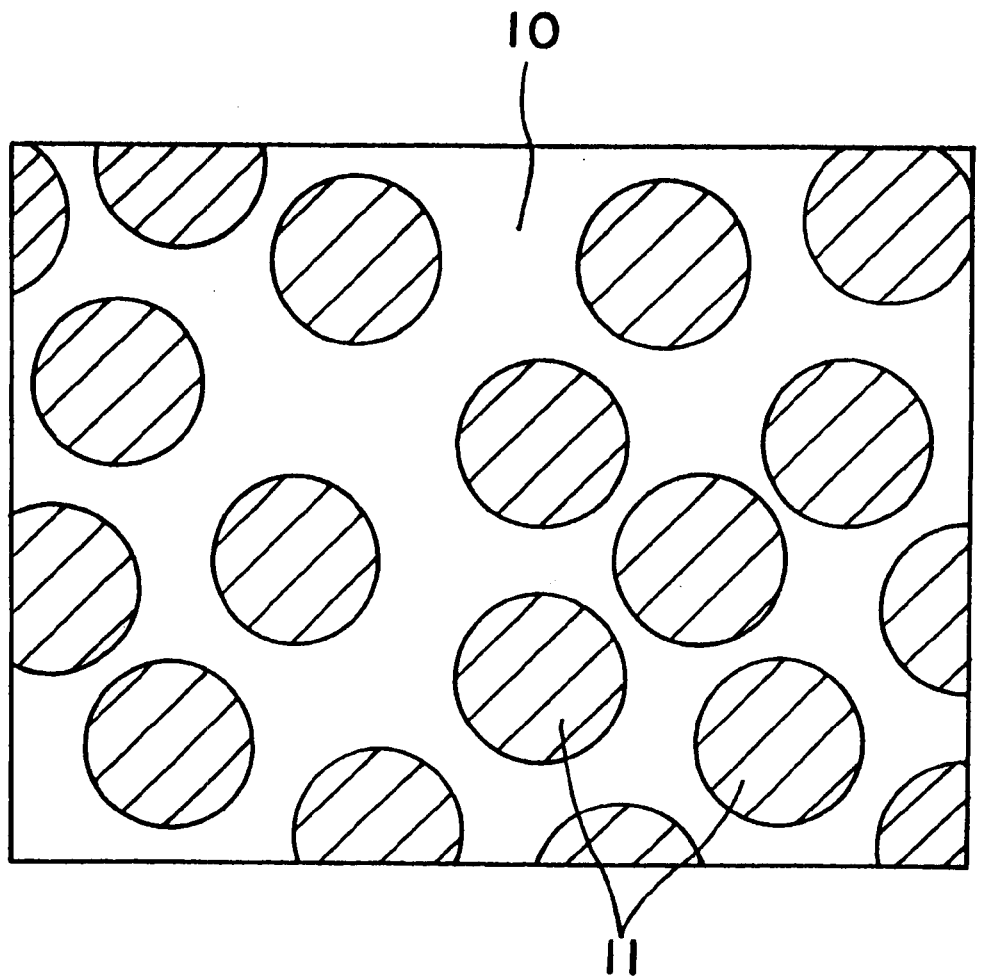
FIG. 2 is an illustration which schematically shows one example of a composite structure (nanocomposite structure) of magnetic powder according to the present invention.
Figure 3:
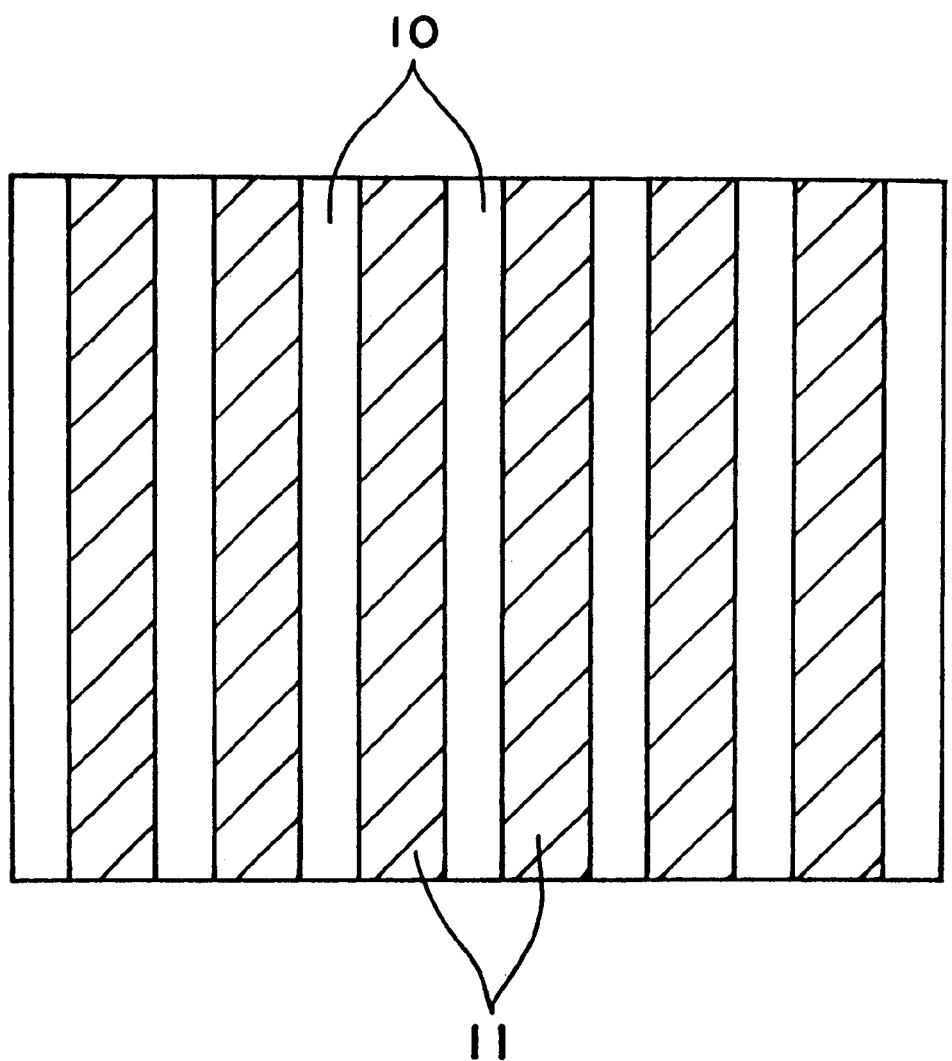
FIG. 3 is an illustration which schematically shows one example of a composite structure (nanocomposite structure) of magnetic powder according to the present invention.

In this composite structure (nanocomposite structure), a soft magnetic phase 10 and a hard magnetic phase 11 exist in a pattern (model) as shown in, for example, FIG. 1, FIG. 2 or FIG. 3, where the thickness of the respective phases and the particle diameter therein are on the order of nanometers (for example, 1–100 nm). Further, the soft magnetic phase 10 and the hard magnetic phase 11 are arranged adjacent to each other (this also includes the case where these phases are adjacent through intergranular phases), which makes it possible to perform magnetic exchange interaction therebetween. In this regard, it is to be noted that the patterns illustrated in FIG. 1 to FIG. 3 are only specific examples, and are not limited thereto. For example, the soft magnetic phase 10 and the hard magnetic phase 11 in FIG. 2 are interchanged to each other.

The magnetization of the soft magnetic phase readily changes its orientation by the action of an external magnetic field. Therefore, when the soft magnetic phase coexists with the hard magnetic phase, the magnetization curve for the entire system shows a stepped "serpentine curve" in the second quadrant of the B—H diagram. However, when the soft magnetic phase has a sufficiently small size of less than several tens of nm, magnetization of the soft magnetic body is sufficiently and strongly constrained through the coupling with the magnetization of the surrounding hard magnetic body, so that the entire system exhibits functions like a hard magnetic body.

A magnet having such a composite structure (nanocomposite structure) has mainly the following five features.
(1) In the second quadrant of the B—H diagram (that is, J-H diagram), the magnetization springs back reversibly (in this sense, such a magnet is also referred to as a "spring magnet").
(2) It has a satisfactory magnetizability, and it can be magnetized with a relatively low magnetic field.
(3) The temperature dependence of the magnetic properties is small as compared with the case where the system is constituted from a hard magnetic phase alone.
(4) The changes in the magnetic properties with the elapse of time are small.
(5) No deterioration in the magnetic properties is observable even if it is finely milled.

In the alloy composition described in the above, the hard magnetic phase and the soft magnetic phase are respectively composed of the followings, for instance.

The hard magnetic phase: $R_2TM_{14}B$ system (where, TM is Fe or Fe and Co), or $R_2(TM, Al)_{14}B$ system (or $R_2(TM, Q)_{14}B$ system, or $R_2(TM, Al, Q)_{14}B$ system).

The soft magnetic phase: TM (α-Fe or α-(Fe, Co) in particular), or an alloy phase of TM and Al, a composite phase of TM and B, or a composite phase of TM, B and Al (or these phases containing Q).

Manufacture of Magnetic Powders

As for the magnetic powders according to this invention, it is preferable that they are manufactured by melt-spinning (quenching) a molten alloy, and more preferable that they are manufactured by milling a melt spun (quenched) ribbon obtained by quenching and solidifying the molten metal of the alloy. An example of such a method will be described in the following.

Figure 4:
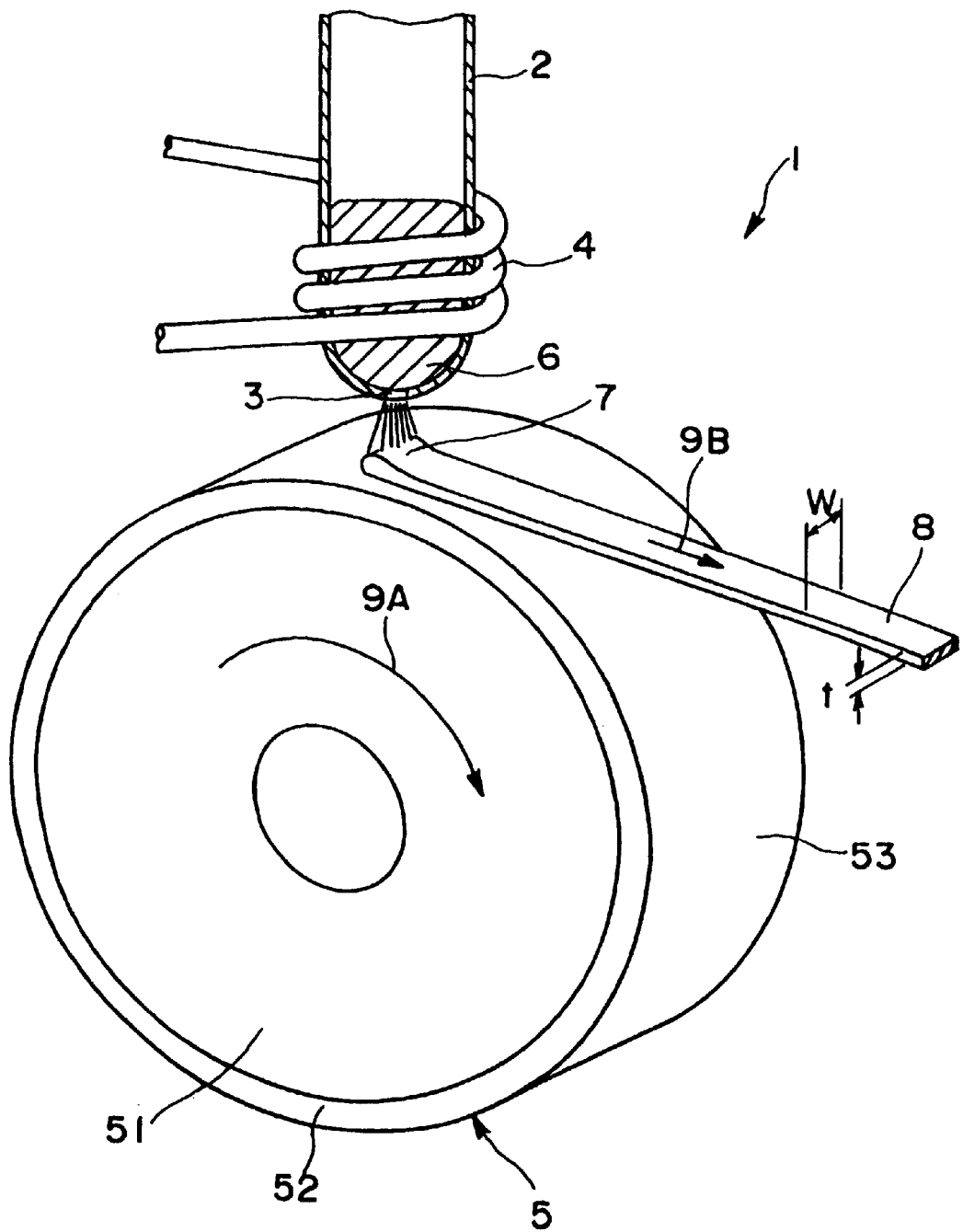
FIG. 4 is a perspective view showing an example of the configuration of an apparatus (melt spinning apparatus) for manufacturing a magnet material.
Figure 5:
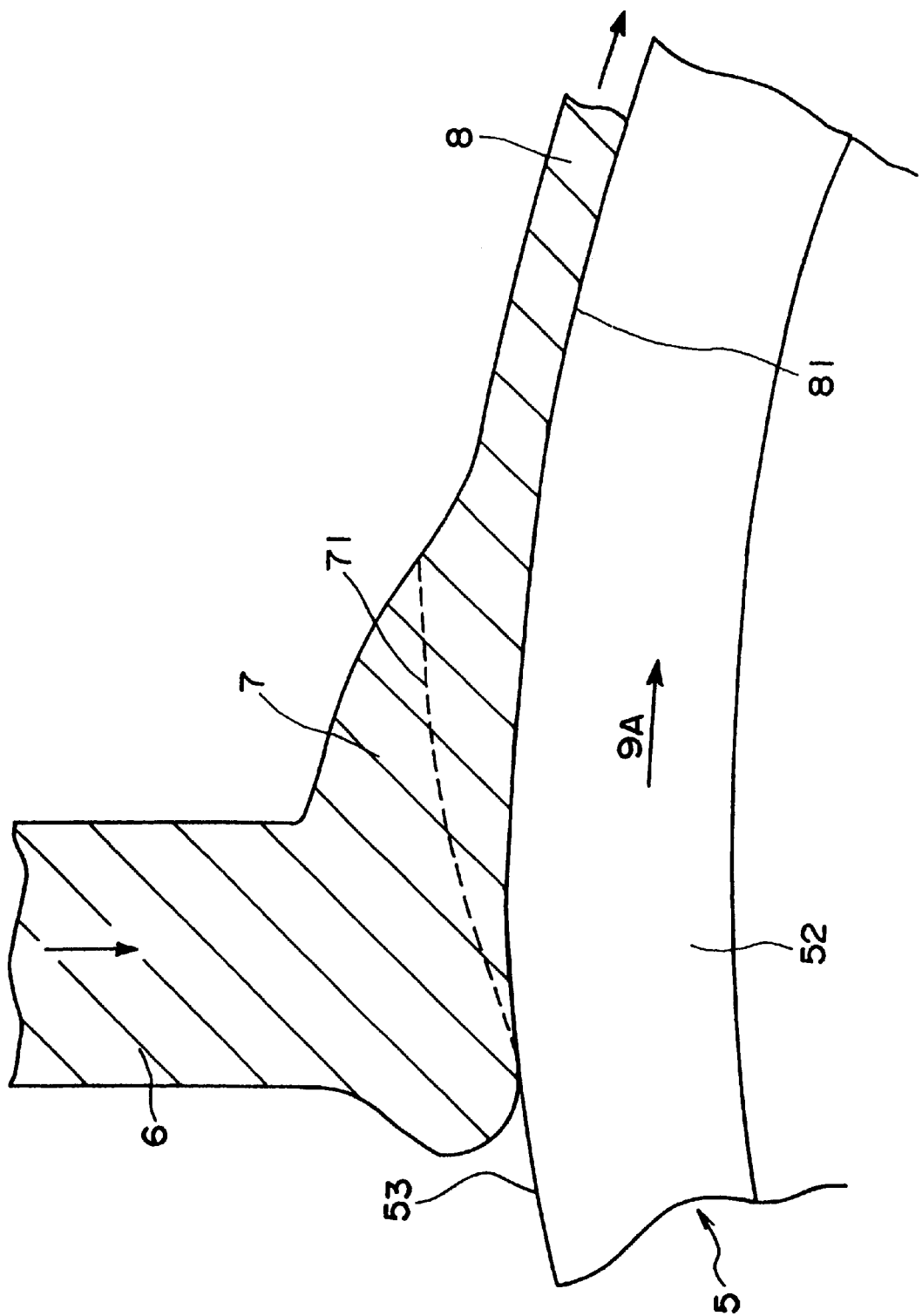
FIG. 5 is a sectional side view showing the situation in the vicinity of colliding section of the molten metal with a cooling roll in the apparatus shown in FIG. 4.

FIG. 4 is a perspective view showing an example of the configuration of an apparatus (melt spinning apparatus) for manufacturing a magnet material by the melt spinning (quenching) method using a single roll, and FIG. 5 is a sectional side view showing the situation in the vicinity of colliding section of the molten metal with the cooling roll in the apparatus shown in FIG. 4.

As shown in FIG. 4, the melt spinning apparatus 1 is provided with a cylindrical body 2 capable of storing the magnet material, and a cooling roll 5 which rotates in the direction of an arrow 9A in the figure relative to the cylindrical body 2. A nozzle (orifice) 3 which injects the molten metal of the magnet material alloy is formed at the lower end of the cylindrical body 2.

In addition, a heating coil 4 is arranged on the outer periphery of the cylindrical body 2 in the vicinity of the nozzle 3, and the magnet material in the cylindrical body 2 is melted by inductively heating the interior of the cylindrical body 2 through application of, for example, a high frequency wave to the coil 4.

The cooling roll 5 is constructed from a base part 51 and a surface layer 52 which forms a circumferential surface 53 of the cooling roll 5.

The base part 51 may be formed either integrally with the surface layer 52 using the same material, or formed using a material different from that of the surface layer 52.

Although there is no particular limitation on the material of the base part 51, it is preferable that the base part 51 is formed of a metallic material with high heat conductivity such as copper or a copper alloy in order to make it possible to dissipate heat of the surface layer 52 as quickly as possible.

Further, it is preferable that the surface layer 52 is formed of a material with heat conductivity equal to or lower than that of the base part 51. Examples of the surface layer 52 include a metallic thin layer of Cr or the like, a layer of metallic oxide and a ceramic layer.

Examples of the ceramics for use in the ceramic layer include oxide ceramics such as $Al_2O_3$, $SiO_2$, $TiO_2$, $Ti_2O_3$, $ZrO_2$, $Y_2O_3$, barium titanate, and strontium tinanate and the like; nitride ceramics such as AlN, $Si_3N_4$, TiN, and BN and the like; carbide ceramics such as graphite, SiC, ZrC, $Al_4C_3$, $CaC_2$, and WC and the like; and mixture of two or more of these ceramics.

The melt spinning apparatus 1 is installed in a chamber (not shown), and it is operated preferably under the condition where the interior of the chamber is filled with an inert gas or other kind of gas. In particular, in order to prevent oxidation of a melt spun ribbon 8, it is preferable that the gas is an inert gas such as argon gas, helium gas, nitrogen gas or the like.

In the melt spinning apparatus 1, the magnet material (alloy) is placed in the cylindrical body 2 and melted by heating with the coil 4, and the molten metal 6 is discharged from the nozzle 3. Then, as shown in FIG. 5, the molten metal 6 collides with the circumferential surface 53 of the cooling roll 5, and after the formation of a puddle 7, the molten metal 6 is cooled down rapidly to be solidified while dragged along the circumferential surface 53 of the rotating cooling roll 5, thereby forming the melt spun ribbon 8 continuously or intermittently. A roll surface 81 of the melt spun ribbon 8 thus formed is soon released from the circumferential surface 53, and the melt spun ribbon 8 proceeds in the direction of an arrow 9B in FIG. 4. The solidification interface 71 of the molten metal is indicated by a broken line in FIG. 5.

The optimum range of the circumferential velocity of the cooling roll 5 depends upon the composition of the molten alloy, the wettability of the circumferential surface 53 with respect to the molten metal 6, and the like. However, for the enhancement of the magnetic properties, a velocity in the range of 1 to 60 m/s is normally preferable, and 5 to 40 m/s is more preferable. If the circumferential velocity of the cooling roll 5 is too small, the thickness t of the melt spun ribbon 8 is too large depending upon the volume flow rate (volume of the molten metal discharged per unit time), and the diameter of the crystalline grains tends to increase. On the contrary, if the circumferential velocity is too large, amorphous structure becomes dominant. Further, in these cases, enhancement of the magnetic properties can not be expected even if a heat treatment is given in the later stage.

Thus obtained melt spun ribbon 8 may be subjected to at least one heat treatment for the purpose of, for example, acceleration of recrystallization of the amorphous structure and homogenization of the structure. The conditions of this heat treatment may be, for example, a heating in the range of 400 to 900° C. for 0.5 to 300 min.

Moreover, in order to prevent oxidation, it is preferred that this heat treatment is performed in a vacuum or under a reduced pressure (for example, in the range of $1 \times 10^{-1}$ to $1 \times 10^{-6}$ Torr), or in a nonoxidizing atmosphere of an inert gas such as nitrogen gas, argon gas, helium gas or the like.

The melt spun ribbon (thin ribbon-like magnet material) 8 obtained as in the above has a microcrystalline structure or a structure in which microcrystals are included in an amorphous structure, and exhibits excellent magnetic properties. The magnetic powder of this invention is obtained by milling thus obtained melt spun ribbon 8.

The milling method of the melt spun ribbon is not particularly limited, and various kinds of milling or crushing apparatus such as ball mill, vibration mill, jet mill, and pin mill may be employed. In this case, in order to prevent oxidation, the milling process may be carried out under vacuum or reduced pressure (for example, under a reduce pressure of $1 \times 10^{-1}$ to $1 \times 10^{-6}$ Torr), or in a nonoxidizing atmosphere of an inert gas such as nitrogen, argon, helium, or the like.

The average particle size of the magnetic powder is not particularly limited. However, in the case where the magnetic powder is used for manufacturing isotropic bonded magnets described later, in order to prevent oxidation of the magnetic powder and deterioration of the magnetic properties during the milling process, it is preferred that the average particle size lies within the range of 0.5 to 150 $\mu$m, more preferably the range of 0.5 to 80 $\mu$m, and still more preferably the range of 1 to 50 $\mu$m.

In order to obtain a better moldability of the bonded magnet, it is preferable to give a certain degree of dispersion to the particle size distribution of the magnetic powder. By so doing, it is possible to reduce the void ratio (porosity) of the bonded magnet obtained. As a result, it is possible to raise the density and the mechanical strength of the bonded magnet assuming that the content of the magnetic powder in the bonded magnet is equal to each other, thereby enabling to further improve the magnetic properties.

Thus obtained magnetic powder may be subjected to a heat treatment for the purpose of, for example, removing the influence of stress introduced by the milling process and controlling the crystalline grain size. The conditions of the heat treatment are, for example, heating at a temperature in the range of 350 to 850° C. for 0.5 to 300 min.

In order to prevent oxidation of the magnetic powder, it is preferable to perform the heat treatment in a vacuum or under a reduced pressure (for example, in the range of $1 \times 10^{-1}$ to $1 \times 10^{-6}$ Torr), or in a nonoxidizing atmosphere of an inert gas such as nitrogen gas, argon gas, and helium gas.

Thus obtained magnetic powder has a satisfactory bindability with the binding resin (wettability of the binding resin). Therefore, when a bonded magnet is manufactured using the magnetic powder described above, the bonded magnet has a high mechanical strength and excellent thermal stability (heat resistance) and corrosion resistance. Consequently, it can be concluded that the magnetic powder is suitable for the manufacture of the bonded magnet.

In the above, the melt spinning (quenching) method is described in terms of the single roll method, but the twin roll method may also be employed. Besides, other methods such as the atomizing method which uses gas atomization, the rotating disk method, the melt extraction method, and the mechanical alloying method (MA) may also be employed. Since such a melt spinning method can refine the metallic structure (crystalline grains), it is effective for enhancing the magnetic properties, especially the coercive force or the like, of the bonded magnet.

Bonded Magnets and Manufacture Thereof

Next, the isotropic rare-earth bonded magnets (hereinafter, referred to simply also as "bonded magnets") according to this invention will be described.

Preferably, the bonded magnets of this invention is formed by binding the above described magnetic powder using a binding resin (binder).

As for the binder, either of a thermoplastic resin or a thermosetting resin may be employed.

Examples of the thermoplastic resin include polyamid (example: nylon 6, nylon 46, nylon 66, nylon 610, nylon 612, nylon 11, nylon 12, nylon 6–12, nylon 6–66, nylon 6T and nylon 9T); thermoplastic polyimide; liquid crystal polymer such as aromatic polyester; poly phenylene oxide; poly phenylene sulfide; polyolefin such as polyethylene, polypropylene and ethylene-vinyl acetate copolymer; modified polyolefin; polycarbonate; poly methyl methacrylate; polyester such as poly ethylen terephthalate and poly butylene terephthalate; polyether; polyether ether ketone; polyetherimide; polyacetal; and copolymer, blended body, and polymer alloy having at least one of these materials as a main ingredient. In this case, a mixture of two or more kinds of these materials may be employed.

Among these resins, a resin containing polyamide as its main ingredient is particularly preferred from the viewpoint of especially excellent moldability and high mechanical strength. Further, a resin containing liquid crystal polymer and/or poly phenylene sulfide as its main ingredient is also preferred from the viewpoint of enhancing the heat resistance. Furthermore, these thermoplastic resins also have an excellent kneadability with the magnetic powder.

These thermoplastic resins provide an advantage in that a wide range of selection can be made. For example, it is possible to provide a thermoplastic resin having a good moldability or to provide a thermoplastic resin having good heat resistance and mechanical strength by appropriately selecting their kinds, copolymerization or the like.

On the other hand, examples of the thermosetting resin include various kinds of epoxy resins of bisphenol type, novolak type, and naphthalene-based, phenolic resin, urea resin, melamine resin, polyester (or unsaturated polyester) resin, polyimide resin, silicone resin, polyurethane resin, and the like. In this case, a mixture of two or more kinds of these materials may be employed.

Among these resins, the epoxy resin, phenolic resin, polyimide resin and silicone resin are preferable from the viewpoint of their special excellence in the moldability, high mechanical strength, and high heat resistance. In this case, the epoxy resin is especially preferable. These thermosetting resins also have an excellent kneadability with the magnetic powder and homogeneity (uniformity) in kneading.

The unhardened thermosetting resin to be used may be either in liquid state or in solid (powdery) state at the room temperature.

The bonded magnet according to this invention described in the above may be manufactured, for example, as in the following. First, the magnetic powder, a binding resin and an additive (antioxidant, lubricant, or the like) as needed are mixed and kneaded (warm kneading) to form a bonded magnet composite (compound). Then, thus obtained bonded magnet composite is formed into a desired magnet form in a space free from magnetic field by a molding method such as compaction molding (press molding), extrusion molding, or injection molding. When the binding resin used is a thermosetting type, the obtained green compact is hardened by heating or the like after molding.

In these three types of molding method, the extrusion molding and the injection molding (in particular, the injection molding) have advantages in that the latitude of shape selection is broad, the productivity is high, and the like. However, these molding methods require to ensure a sufficiently high fluidity of the compound in the molding machine in order to obtain a satisfactory moldability. For this reason, in these methods it is not possible to increase the content of the magnetic powder, namely, to make the bonded magnet having high density, as compared with the case of the compaction molding method. In this invention, however, it is possible to obtain a high magnetic flux density as will be described later, so that excellent magnetic properties can be obtained even without making the bonded magnet high density. This advantage of the present invention can also be extended even in the case where bonded magnets are manufactured by the extrusion molding method or the injection molding method.

The content of the magnetic powder in the bonded magnet is not particularly limited, and it is normally determined by considering the kind of the molding method and the compatibility of moldability and high magnetic properties. More specifically, it is preferable to be in the range of 75–99.5 wt %, and more preferably in the range of 85–97.5 wt %.

In particular, in the case of a bonded magnet to be manufactured by the compaction molding method, the content of the magnetic powder should preferably lie in the range of 90–99.5 wt %, and more preferably in the range of 93–98.5 wt %.

Further, in the case of a bonded magnet to be manufactured by the extrusion molding or the injection molding, the content of the magnetic powder should preferably lie in the range of 75–98 wt %, and more preferably in the range of 85–97 wt %.

The density $\rho$ of the bonded magnet is determined by factors such as the specific gravity of the magnetic powder contained in the magnet and the content of the magnetic powder, and void ratio (porosity) of the bonded magnet and the like. In the bonded magnets according to this invention, the density $\rho$ is not particularly limited to a specific value, but it is preferable to be in the range of 5.3–6.6 $Mg/m^3$, and more preferably in the range of 5.5–6.4 $Mg/m^3$.

In this invention, since the magnetic flux density and the coercive force of the magnetic powder are high, the bonded magnet formed from the magnetic powder provides excellent magnetic properties (especially, high maximum magnetic energy product $(BH)_{max}$) even when the content of the magnetic powder is relatively low. In this regard, it goes without saying that it is possible to obtain the excellent magnetic properties in the case where the content of the magnetic powder is high.

The shape, dimensions, and the like of the bonded magnet manufactured according to this invention are not particularly limited. For example, as to the shape, all shapes such as columnar, prism-like, cylindrical (ring-shaped), circular, plate-like, curved plate-like, and the like are acceptable. As to the dimensions, all sizes starting from large-sized one to ultraminuaturized one are acceptable. However, as repeatedly described in this specification, the present invention is particularly advantageous in miniaturization and ultraminiaturization of the bonded magnet.

Further, in view of the advantages described above, it is preferred that the bonded magnet of the present invention is subject to multipolar magnetization has been magnetized so as to have multipoles.

Further, in the present invention, it is preferred that the bonded magnet can satisfy the following conditions.

(1) The coercive force ($H_{CJ}$) of the bonded magnet (that is, the intrinsic coercive force at room temperature) should lie in the range of 320 to 720 kA/m. In this case, it is preferred that the range of 400 to 640 kA/m is more preferable. If the coercive force is lower than the lower limit value, demagnetization occurs conspicuously when a reverse magnetic field is applied depending upon the usage of the motor and the heat resistance at a high temperature is deteriorated. On the other hand, if the coercive force exceeds the above upper limit value, magnetizability is deteriorated. Therefore, by setting the coercive force ($H_{CJ}$) to the above range, in the case where the bonded magnet (cylindrical magnet in particular) is subjected to multipolar magnetization, a satisfactory magnetization can be accomplished even when a sufficiently high magnetizing field cannot be secured, which makes it possible to obtain a sufficient magnetic flux density, and to provide a high performance bonded magnet, especially a bonded magnet for motor.

(2) The bonded magnet should satisfy the following formula (I) between the maximum magnetic energy product $(BH)_{max}$ described later and the density $\rho$ (Mg/m$^3$).

$$2.1 \leq (BH)_{max}/\rho^2 [\times 10^{-9} J \cdot m^3/g^2] \quad (I)$$

In this connection, it is more preferable that the following formula (II) is satisfied between the maximum magnetic energy product $(BH)_{max}$ and the density $\rho$ (Mg/m$^3$), and it is most preferable that the following formula (III) is satisfied therebetween.

$$2.2 \leq (BH)_{max}/\rho^2 [\times 10^{-9} J \cdot m^3/g^2] \leq 3.2 \quad (II)$$

$$2.3 \leq (BH)_{max}/\rho^2 [\times 10^{-9} J \cdot m^3/g^2] \leq 3.1 \quad (III)$$

When the value of $(BH)_{max}/\rho^2 [\times 10^{-9} J \cdot m^3/g^2]$ is less than the lower limit value of the formula (I), it is not possible to obtain sufficient magnetic properties unless otherwise the density of the magnet is increased, that is the content of the magnetic powder in the magnet is increased. However, this in turn leads to problems in that available molding methods are limited, manufacturing cost is increased, and moldability is lowered due to a reduced amount of the binding resin. Further, when magnetic properties of a certain level are to be obtained, a volume of the magnet is necessarily increased, which results in difficulty in miniaturizing devices such as motors.

(3) The bonded magnet should satisfy the following formula (IV) between the remanent magnetic flux density Br(T) and the density $\rho$ (Mg/m$^3$).

$$0.125 \leq Br/\rho [\times 10^{-6} T \cdot m^3/g] \quad (IV)$$

In this connection, it is more preferable that the following formula (V) is satisfied between the remanent magnetic flux density Br(T) and the density $\rho$ (Mg/m$^3$), and it is most preferable that the following formula (VI) is satisfied therebetween.

$$0.128 \leq Br/\rho [\times 10^{-6} T \cdot m^3/g] \leq 0.16 \quad (V)$$

$$0.13 \leq Br/\rho [\times 10^{-6} T \cdot m^3/g] \leq 0.155 \quad (VI)$$

When the value of $Br/\rho [\times 10^{-6} T \cdot m^3/g]$ is less than the lower limit value of the formula (I), it is not possible to obtain a sufficient magnetic flux density unless otherwise the density of the magnet is increased, that is the content of the magnetic powder in the magnet is increased. However, this in turn leads to problems in that available molding methods are limited, manufacturing cost is increased, and moldability is lowered due to a reduced amount of the binding resin. Further, when a magnetic flux density of a certain level is to be obtained, a volume of the magnet is necessarily increased, which results in difficulty in miniaturizing devices such as motors.

(4) It is preferable that the maximum magnetic energy product $(BH)_{max}$ of the bonded magnet is equal to or greater than 60 kJ/m$^3$, more preferably equal to or greater than 65 kJ/m$^3$, and most preferably in the range of 70 to 130 kJ/m$^3$. When the maximum magnetic energy product $(BH)_{max}$ is less than 60 kJ/m$^3$, it is not possible to obtain a sufficient torque when used for motors depending on the types and structures thereof.

(5) It is preferable that the absolute value of the irreversible flux loss (that is, initial flux loss) is equal to or less than 6.2%, it is more preferably that it is equal to or less than 5.0%, and it is most preferable that it is equal to or less than 4.0%. This makes it possible to obtain a bonded magnet having excellent heat stability (heat resistance).

EXAMPLES

Hereinbelow, the actual examples of the present invention will be described.

Example 1

Magnetic powders with alloy compositions $(Nd_{0.7}Pr_{0.25}Dy_{0.05})_{8.5}Fe_{bal}Co_{7.0}B_{5.3}Al_w$ (that is, various types of magnetic powders in which the content w of Al is changed variously) were obtained by the method described below.

First, each of the materials Nd, Pr, Dy, Fe, Co, B and Al was weighed, and then they were cast to produce a mother alloy ingot, and a sample of about 15 g was cut out from the ingot.

A melt spinning apparatus 1 as shown in FIG. 4 and FIG. 5 was prepared, and the sample was placed in a quartz tube 2 having a nozzle 3 (circular orifice of which diameter is 0.6 mm) at the bottom. After evacuating the interior of a chamber in which the melt spinning apparatus 1 is housed, an inert gas (Ar gas) was introduced to obtain an atmosphere with desired temperature and pressure.

The cooling roll 5 of the melt spinning apparatus 1 is provided with a surface layer 52 on the outer periphery of the base part 51 made of Cu. The surface layer 52 is formed of ZrC and has a thickness of about 6 μm.

Then, the ingot sample in the quartz tube 2 was melted by high frequency induction heating. Further, the jetting pressure (difference between the inner pressure of the quartz tube 2 and the pressure of the atmosphere) and the circumferential velocity were adjusted to obtain a melt spun ribbon.

Thus obtained melt spun ribbon was then coarsely crushed, and the powder was subjected to a heat treatment in an argon gas atmosphere at 690° C. for 300 sec. In this way, the various types of magnetic powders each having different contents w of Al were obtained.

Next, for the purpose of adjustment of the particle size, each magnetic powder is milled by a milling machine in an argon gas atmosphere to obtain a magnetic powder having an average particle size of 50 μm.

To analyze the phase structure of the obtained magnetic powders, the respective magnetic powder was subjected to X-ray diffraction using Cu-Kα line at the diffraction angle of 20°–60°. From the thus obtained diffraction pattern, the presence of diffracted peaks of a hard magnetic phase, $R_2(Fe.Co)_{14}B$ phase, and a soft magnetic phase, α-(Fe,Co) phase, were confirmed. Further, from the observation result using a transmission electron microscope (TEM), the formation of a composite structure (nanocomposite structure) was confirmed in each magnetic powder.

A composite (compound) for bonded magnet was prepared by mixing the respective magnetic powder with a polyamide resin (Nylon 12) and a small amount of hydrazine antioxidant and lubricant, and then kneading them under the temperature of 225° C. for 15 min. In this case, the compounding ratio (mixing ratio by weight) of the magnetic powder with respect to the polyamide resin was common to the respective bonded magnets. Specifically, in each of the bonded magnets, the content of the magnetic powder was about 97 wt %.

Then, each of the thus obtained compounds was crushed to be granular. Then, the granular substance was weighed and filled into a die of a press machine, and and then it was subjected to a compaction molding (in the absence of a magnetic field) under the temperature of 215° C. and the pressure of 750 MPa, to obtain an isotropic bonded magnet of a columnar shape having a diameter of 10 mm and a height of 7 mm.

After pulse magnetization is performed for the respective bonded magnets under the magnetic field strength of 3.2 MA/m, magnetic properties (remanent magnetic flux density Br, intrinsic coercive force ($H_{CJ}$), and maximum magnetic energy product $(BH)_{max}$) were measured using a DC recording fluxmeter (manufactured and sold by Toei Industry Co. Ltd with the product code of TRF-5BH) under the maximum applied magnetic field of 2.0 MA/m. The temperature at the measurement was 23° C. (that is, room temperature).

Next, the heat resistance (heat stability) of each of the bonded magnets was examined. The heat resistance was obtained by measuring the irreversible flux loss (initial flux loss) obtained when the bonded magnet was being left in the atmosphere of 100° C. for one hour and then the temperature was lowered to the room temperature, and then it was evaluated. The results thereof are shown in the attached Table 1. In this connection, it is to be noted that smaller absolute value of the irreversible flux loss (initial flux loss) means more excellent heat resistance (heat stability).

The content of Al, the density ρ, the remanent magnetic flux density Br, the coercive force $H_{cj}$, the maximum magnetic energy product $(BH)_{max}$ and the irreversible flux loss of each of the bonded magnets are shown in the attached Table 1.

As seen from the attached Table 1, each of the bonded magnets of the sample numbers of No. 2 to No. 6 (Examples of the present invention) exhibits excellent magnetic properties (remanent magnetic flux density, maximum magnetic energy product and intrinsic coercive force), and has small absolute value of the irreversible flux loss so that the heat stability (heat resistance) of these magnets is high.

In contrast, each the bonded magnets of the sample numbers of No. 1 and No. 7 (Comparative Examples) exhibits poor magnetic properties and has large absolute value of the irreversible flux loss so that the heat stability (heat resistance) of these magnets is low.

Example 2

In the same manner as Example 1, magnetic powders with alloy compositions $(Nd_{0.75}Pr_{0.2}Dy_{0.05})_{8.6}Fe_{bal}Co_{6.9}B_{5.4}Al_{1.0}$ were obtained by the method described below.

A composite (compound) for bonded magnet was prepared by mixing the respective magnetic powder with a polyamide resin (Nylon 12) and a small amount of hydrazine antioxidant and lubricant, and then kneading them under the temperature of 200–230° C. for 15 min. In this case, the content of the magnetic powder to be contained in each of the bonded magnets was variously changed to obtain seven types of compounds.

Among thus obtained compounds, the compounds having a relatively high content of the magnetic powder were crushed to be granular, and then they were subjected to a compaction molding (in the absence of a magnetic field), while the compounds having a relatively small content of the magnetic powder were crushed to be granular, and then they were subjected to an injection molding (in the absence of a magnetic field), thereby forming bonded magnets.

In this connection, it is to be noted that each bonded magnet was formed into a columnar shape having a diameter of 10 mm and a height of 7 mm.

Further, it is also to be noted that the compaction molding was carried out by filing each granular substance into a die of a press machine and then it was subjected to a compaction molding under the temperature of 210–220° C. and the pressure of 750 MPa. Further, the injection molding was carried out under the conditions that the die temperature at molding was 90° C. and the temperature inside the injection cylinder was 230–280° C.

For each of thus obtained bonded magnets, magnetic properties thereof were measured and heat resistance thereof was also tested in the same manner as the Example 1.

The kneading temperature, the molding method, the molding temperature, the density ρ, the remanent magnetic flux density Br, the coercive force $H_{cj}$, the maximum magnetic energy product $(BH)_{max}$ and the irreversible flux loss of each of the bonded magnets are shown in the attached Table 2.

As seen from the attached Table 2, the bonded magnets according to the present invention exhibit, over the wide range of the value of the density ρ, excellent magnetic properties (remanent magnetic flux density Br, maximum magnetic energy product $(BH)_{max}$, and coercive force $(H_{CJ})$) and have a small absolute value of the irreversible flux loss so that the heat stability (heat resistance) of these magnets is also excellent.

In particular, the bonded magnets according to the present invention exhibit excellent magnetic properties even in the case where the bonded magnets are low density bonded magnets (that is, bonded magnets having a small content of the magnetic powder) which can be obtained by means of an injection molding. The reason of this is supposed as follows.

When bonded magnets are low density, that is bonded magnets have a relatively large content of the binding resin, fluidity of the compound during the kneading process or molding process is high. This makes it possible to knead the magnetic powder and the binding resin at a relatively low temperature within a short time period, so that it is possible to easily accomplish that the magnetic powder and the binding resin are uniformly mixed during the kneading process. Further, such a high fluidity of the compound makes it possible to easily carry out the molding at a relatively low temperature within a short time period. In other words, molding conditions can be moderated. As a result, it becomes possible to hold the deterioration (e.g. oxidization) of the magnetic powder during the kneading process and molding process at the minimum level, which results in production of bonded magnets having high magnetic properties as well as improvement of the moldability.

Further, the high fluidity of the compound makes it possible to lower a void ratio of the obtained bonded magnets, so that mechanical strength and magnetic properties thereof are also improved.

Example 3

Using the magnetic powders obtained by Example 1, cylindrical (ring-shaped) isotropic bonded magnets having outer diameter of 22 mm, inner diameter of 20 mm and height of 4 mm were manufactured in the same manner as Example 1. Then, thus obtained bonded magnets were subjected to a multi-pole magnetization so as to have eight poles. At the magnetization process, an electric current of 16 kA was flowing through a magnetizing coil.

In this case, a magnitude of the magnetizing magnetic field for achieving 90% magnetizing ratio was relatively small, and this means that the magnetizability was excellent.

Further, using each bonded magnet as a magnet for a rotor, a spindle motor for CD-ROM drive was assembled. Then, each of the DC motors was rotated at 1000 rpm to measure a back electromotive force generated in the coil winding thereof. As a result, it has been confirmed that a voltage equal to or less than 0.80V can be obtained in the motors using the bonded magnets of the samples No. 1 and No. 7 (Comparative Examples), while a voltage equal to or greater than 0.96V which is more than 20% higher value can be obtained in the motors using the bonded magnets of the samples No. 2 to No. 6 (Example of present invention).

With this result, it has found that it is possible to manufacture high performance motors by using the bonded magnets of the present invention.

In addition to the above, bonded magnets same as those of Examples 1 to 3 were manufactured excepting that they are formed by means of an extrusion molding (the content of the magnetic powder in each bonded magnet was 92 to 95 wt %). Then, the performance of these bonded magnets were examined. As a result, it has found that the same results can be obtained by the motors using the bonded magnets.

Further, bonded magnets same as those of Examples 1 to 3 were manufactured excepting that they are formed by means of an injection molding (the content of the magnetic powder in each bonded magnet was 90 to 93 wt %). Then, the performance of these bonded magnets were examined. As a result, it has found that the same results can be obtained by the motors using the bonded magnets.

Effects of the Invention

As described above, according to the present invention, the following effects can be obtained.

Since each of the magnetic powders contains a predetermined amount of Al and has a composite structure having a soft magnetic phase and a hard magnetic phase, they have high magnetization and exhibit excellent magnetic properties. In particular, intrinsic coercive force and rectangularity thereof are improved.

The absolute value of the irreversible flux loss is small and excellent heat resistance (heat stability) can be obtained.

Because of the high magnetic flux density that can be secured by this invention, it is possible to obtain a bonded magnet with high magnetic performance even if it is isotropic. In particular, since magnetic properties equivalent to or better than the conventional isotropic bonded magnet can be obtained with a magnet of smaller volume as compared with the conventional isotropic bonded magnet, it is possible to provide a high performance motor of a smaller size.

Moreover, since a higher magnetic flux density can be secured, in manufacturing a bonded magnet sufficiently high magnetic performance is obtainable without pursuing any means for elevating the density of the bonded magnet. As a result, the dimensional accuracy, mechanical strength, corrosion resistance, heat resistance (heat stability) and the like can be improved in addition to the improvement in the moldability, so that it is possible to readily manufacture a bonded magnet with high reliability.

Since the magnetizability of the bonded magnet according to this invention is excellent, it is possible to magnetize a magnet with a lower magnetizing field. In particular, multipolar magnetization or the like can be accomplished easily and surely, and further a high magnetic flux density can be obtained.

Since a high density is not required to the bonded magnet, the present invention is adapted to the manufacturing method such as the extrusion molding method or the injection molding method by which molding at high density is difficult as compared with the compaction molding method, and the effects described in the above can also be realized in the bonded magnet manufactured by these molding methods. Accordingly, various molding method can be selectively used and thereby the degree of selection of shape for the bonded magnet can be expanded.

Finally, it is to be understood that the present invention is not limited to Examples described above, and many changes or additions may be made without departing from the scope of the invention which is determined by the following claims.

TABLE 1

| Sample No. | W | $\rho$ (Mg/m$^3$) | Br (T) | H$_{cJ}$ (kA/m) | (BH)$_{max}$ (kJ/m$^3$) | (BH)$_{max}$/$\rho^2$ (×10$^{-9}$J · m$^3$/g$^2$) | Br/$\rho$ (×10$^{-6}$T · m$^3$/g) | Irreversible Flux Loss (%) |
|---|---|---|---|---|---|---|---|---|
| 1 (Comp. Ex.) | 0 | 6.27 | 0.82 | 319 | 70.7 | 1.80 | 0.131 | −7.0 |
| 2 (This Invention) | 0.04 | 6.26 | 0.87 | 390 | 100.1 | 2.55 | 0.139 | −5.2 |
| 3 (This Invention) | 0.1 | 6.32 | 0.90 | 462 | 108.3 | 2.71 | 0.142 | −4.5 |
| 4 (This Invention) | 0.2 | 6.29 | 0.91 | 480 | 111.1 | 2.81 | 0.145 | −3.9 |
| 5 (This Invention) | 0.5 | 6.30 | 0.88 | 503 | 106.9 | 2.69 | 0.140 | −3.5 |

TABLE 1-continued

| Sample No. | W | ρ (Mg/m$^3$) | Br (T) | H$_{cJ}$ (kA/m) | (BH)$_{max}$ (kJ/m$^3$) | (BH)$_{max}$/ρ$^2$ (×10$^{-9}$ J·m$^3$/g$^2$) | Br/ρ (×10$^{-6}$ T·m$^3$/g) | Irreversible Flux Loss (%) |
|---|---|---|---|---|---|---|---|---|
| 6 (This Invention) | 1.5 | 6.33 | 0.83 | 542 | 93.7 | 2.34 | 0.131 | −3.1 |
| 7 (Comp. Ex.) | 2.2 | 6.31 | 0.76 | 538 | 76.2 | 1.91 | 0.120 | −4.0 |

TABLE 2

| Sample No. | Kneading Temp. (°C.) | Molding Method | Molding Temp. (°C.) | ρ (Mg/m$^3$) | Br (T) | H$_{cJ}$ (kA/m) | (BH)$_{max}$ (kJ/m$^3$) | (BH)$_{max}$/ρ$^2$ (×10$^{-9}$ J·m$^3$/g$^2$) | Br/ρ (×10$^{-6}$ T·m$^3$/g) | Irreversible Flux Loss (%) |
|---|---|---|---|---|---|---|---|---|---|---|
| 8 (This Invention) | 220 | Injection Molding | 230 | 5.30 | 0.78 | 532 | 80.4 | 2.86 | 0.147 | −2.4 |
| 9 (This Invention) | 203 | Injection Molding | 245 | 5.50 | 0.80 | 521 | 85.2 | 2.82 | 0.145 | −2.7 |
| 10 (This Invention) | 211 | Injection Molding | 260 | 5.67 | 0.82 | 513 | 89.8 | 2.79 | 0.144 | −3.0 |
| 11 (This Invention) | 216 | Injection Molding | 275 | 5.80 | 0.83 | 506 | 93.2 | 2.77 | 0.143 | −3.2 |
| 12 (This Invention) | 220 | Compaction Molding | 210 | 5.95 | 0.84 | 501 | 97.3 | 2.75 | 0.141 | −3.5 |
| 13 (This Invention) | 224 | Compaction Molding | 215 | 6.21 | 0.87 | 495 | 105.2 | 2.73 | 0.140 | −4.0 |
| 14 (This Invention) | 230 | Compaction Molding | 220 | 6.48 | 0.90 | 481 | 113.4 | 2.70 | 0.139 | −4.6 |

What is claimed is:

1. A magnetic powder comprising:

an alloy composition represented by R$_x$(Fe$_{1-y}$Co$_y$)$_{100-x-z-w}$B$_z$Al$_w$ (where R is at least one rare-earth element, x is 7.1–9.0 at %, y is 0–0.30, z is 4.6–6.9 at %, and w is 0.02–1.5 at %), the magnetic powder being constituted from a composite structure having a soft magnetic phase and a hard magnetic phase;

the soft magnetic phase and the hard magnetic phase have a mean crystal grain size of 1–100 nm;

wherein the magnetic powder has magnetic properties in which, when an isotropic bonded magnet having a density ρ [Mg/in$^3$] is molded by mixing the magnetic powder with a binding resin, the maximum magnetic energy product (BH)$_{max}$[kJ/m$^3$] of the bonded magnet at room temperature satisfies the relationship represented by the formula (BH)$_{max}$/ρ$^2$[×10$^{-9}$ J·m$^3$/g$^2$]≧2.1, and the intrinsic coercive force (H$_{cJ}$) of the bonded magnet at room temperature is in the range of 320–720 kA/m.

2. The magnetic powder as claimed in claim 1, wherein when the isotropic bonded magnet having a density ρ[Mg/in$^3$] is molded by mixing the magnetic powder with the binding resin, the remanent magnetic flux density Br[T] at room temperature satisfies the relationship represented by the formula of Br/ρ [×10$^{-6}$ T·m$^3$/g]≧0.125.

3. A magnetic powder comprising:

X an alloy composition represented by R$_x$(Fe$_{1-y}$Co$_y$)$_{100-x-z-w}$B$_z$Al$_w$ (where R is at least one rare-earth element, x is 7.1–9.0 at %, y is 0–0.30, z is 4.6–6.9 at %, and w is 0.02–1.5 at %), the magnetic powder being constituted from a composite structure having a soft magnetic phase and a hard magnetic phase;

the soft magnetic phase and the hard magnetic phase have a mean crystal grain size of 1–100 nm;

wherein the magnetic powder has magnetic properties in which, when an isotropic bonded magnet having a density ρ [Mg/in$^3$] is molded by mixing the magnetic powder with the binding resin, the remanent magnetic flux density Br[T] at room temperature satisfies the relationship represented by the formula of Br/ρ [×10$^{-6}$ T·m$^3$/g]≧0.125.

4. The magnetic powder as claimed in claim 3, wherein when the isotropic bonded magnet is molded by mixing the magnetic powder with the binding resin, the intrinsic coercive force (H$_{cJ}$) of the magnet at room temperature is in the range of 320–720 kA/m.

5. The magnetic powder as claimed in any one of claims 1 to 4, wherein when the isotropic bonded magnet is molded by mixing the magnetic powder with the binding resin, the absolute value of the irreversible flux loss (initial flux loss) is equal to or less than 6.2%.

6. The magnetic powder as claimed in any one of claims 1 to 4, wherein said R comprises rare-earth elements mainly containing Nd and/or Pr.

7. The magnetic powder as claimed in any one of claims 1 to 4, wherein said R includes Pr and a ratio of Pr with respect to the total mass of said R is 5–75%.

8. The magnetic powder as claimed in any one of claims 1 to 4, wherein said R includes Dy and a ratio of Dy with respect to the total mass of said R is equal to or less than 14%.

9. The magnetic powder as claimed in any one of claims 1 to 4, wherein the magnetic powder has been made by quenching a molten state of the alloy.

10. The magnetic powder as claimed in any one of claims 1 to 4, wherein the magnetic powder has been obtained by forming a melt spun ribbon of the alloy on a cooling roll and then milling the melt spun ribbon.

11. The magnetic powder as claimed in any one of claims 1 to 4, wherein the magnetic powder is subjected to a heat treatment for at least once during the manufacturing process or after the magnetic powder's manufacture.

12. The magnetic powder as claimed in any one of claims 1 to 4, wherein the average particle size of the magnetic powder lies in the range of 0.5–150 μm.

13. The magnetic powder according to claim 1, wherein the hard magnetic phase is the main phase.

14. The magnetic powder according to claim 3, wherein the hard magnetic phase is the main phase.

* * * * *

UNITED STATES PATENT AND TRADEMARK OFFICE
CERTIFICATE OF CORRECTION

PATENT NO. : 6,551,418 B2
DATED : April 22, 2003
INVENTOR(S) : Arai et al.

It is certified that error appears in the above-identified patent and that said Letters Patent is hereby corrected as shown below:

Column 2,
Line 22, "bonded the" should be -- the bonded --;

Column 3,
Line 54, delete "an";

Column 4,
Line 6, "Other" should be -- Another --;

Column 8,
Line 50, "followings" should be -- following --;

Column 10,
Line 35, "reduce" should be -- reduced --;

Column 11,
Line 28, "polyamid" should be -- polyamide --;

Column 15,
Line 57, "$H_{cj}$" should be -- $H_{CJ}$ --;

Column 16,
Line 33, "filing" should be -- filling --;
Line 46, "$H_{cj}$" shoud be -- $H_{CJ}$ --;

UNITED STATES PATENT AND TRADEMARK OFFICE
CERTIFICATE OF CORRECTION

PATENT NO. : 6,551,418 B2
DATED : April 22, 2003
INVENTOR(S) : Arai et al.

It is certified that error appears in the above-identified patent and that said Letters Patent is hereby corrected as shown below:

Column 19,
Line 41 and 65, "[$Mg/in^3$]" should be -- $Mg/m^3$ ] --;
Lines 49-50, "[$Mg/in^3$]" should be -- $Mg/m^3$ ] --;
Line 55, delete "X".

Signed and Sealed this

Third Day of February, 2004

JON W. DUDAS
*Acting Director of the United States Patent and Trademark Office*